United States Patent [19]
Okamoto

[11] Patent Number: 6,059,641
[45] Date of Patent: May 9, 2000

[54] POWDER/GRANULE FEEDER AND ITS APPLICATION APPARATUS

[75] Inventor: Naoki Okamoto, Kumamoto, Japan

[73] Assignee: Kyoei Inc., Kumamoto, Japan

[21] Appl. No.: 09/230,573

[22] PCT Filed: Jun. 1, 1998

[86] PCT No.: PCT/JP98/02416

§ 371 Date: Jan. 27, 1999

§ 102(e) Date: Jan. 27, 1999

[87] PCT Pub. No.: WO98/54071

PCT Pub. Date: Dec. 3, 1998

[30] Foreign Application Priority Data

May 30, 1997 [JP] Japan .................................. 9-158003

[51] Int. Cl.⁷ .................................................. B24B 57/00
[52] U.S. Cl. .............................. 451/99; 451/87; 451/100; 451/88; 451/446
[58] Field of Search ............................. 451/446, 88, 100, 451/2, 38, 60, 87, 89, 99, 447; 55/340, 459.1; 209/21, 139.1, 139.2, 142; 406/121

[56] References Cited

U.S. PATENT DOCUMENTS

| | | | |
|---|---|---|---|
| 5,100,412 | 3/1992 | Rosso | 451/88 |
| 5,107,630 | 4/1992 | Lodewijk | 451/88 |
| 5,529,530 | 6/1996 | McPhee et al. | 451/88 |
| 5,562,531 | 10/1996 | Yamaharu | 451/89 |
| 5,800,246 | 9/1998 | Tomioka | 451/88 |
| 5,839,951 | 11/1998 | Tomioka | 451/88 |

FOREIGN PATENT DOCUMENTS

| | | |
|---|---|---|
| 51-95353 | 8/1976 | Japan . |
| 59-50669 | 4/1984 | Japan . |
| 7-290364 | 11/1995 | Japan . |

*Primary Examiner*—M. Rachuba
*Attorney, Agent, or Firm*—Mechant & Gould P.C.

[57] ABSTRACT

A grit tank (1), the inside of which is partitioned into an upper chamber (2), intermediate chamber and lower chamber (5), the intermediate chamber being partitioned into a left intermediate chamber (3) and a right intermediate chamber (4), is connected to a transport pipe (16) via a discharge port (9) of the lower chamber (5). The intermediate chambers (3, 4) are respectively communicated with the upper chamber (2) and the lower chamber (5) via a left upper communicating port (6) and a right upper communicating port (10) and also via a left lower communicating port (8) and a right lower communicating port (12). The communicating ports are respectively provided with a left filling valve (7), right filling valve (11) and changeover type feed valve (13). Between the upper chamber 2 and the intermediate chambers (3, 4) and also between the lower chamber (5) and the intermediate chambers (3, 4), there are respectively provided a left upper pressure equalizer pipe (23), right upper pressure equalizer pipe (24), left lower pressure equalizer pipe (25) and right lower pressure equalizer pipe (26).

7 Claims, 14 Drawing Sheets

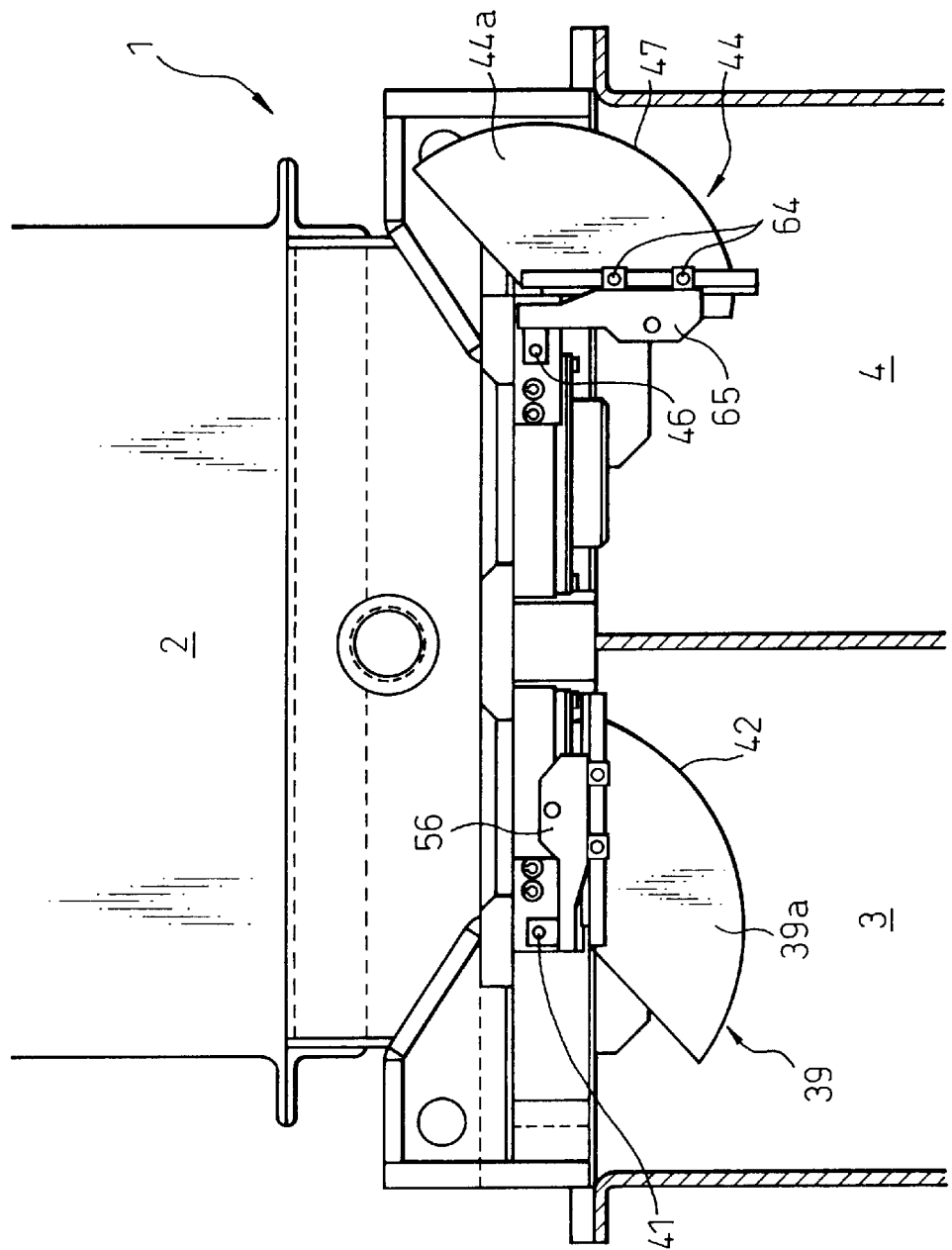

POWDER/GRANULE FEEDER AND ITS APPLICATION APPARATUS

TECHNICAL FIELD

The present invention relates to a fine particle feeder and a shot blasting device into which the fine particle feeder is incorporated. More particularly, the present invention relates to a fine particle feeder for continuously feeding fine particle-shaped grit or common grit, which will be referred to as fine particles in this specification hereinafter, by which a surface of a steel plate or a concrete wall is polished when the particle-shaped grit is made to collide with the surface to be polished. Also, the present invention relates to a shot blasting device into which the fine particle feeder is incorporated.

BACKGROUND ART

Conventionally, there is provided a fine particle feeder, which is composed as follows. There is provided a fine particle tank in which fine particles are stored, and a lower portion of the fine particle tank is connected with an air feed pipe into which air at high pressure is fed. An internal space of the fine particle tank is partitioned into three sections in the vertical direction. Communicating ports are formed on a top and a bottom surface of the intermediate section. Opening and closing valves are respectively arranged in the communicating ports. When the upper opening and closing valve is opened, the fine particles are filled from the upper section into the intermediate section. After the upper opening and closing valve has been closed, the lower opening and closing valve is opened, so that the fine particles are discharged from the intermediate section into the lower section, and the fine particles are made to drop from the lower section into the lower air feed pipe, so that the fine particles are mixed with air of high pressure and transported together with air of high pressure. However, the above fine particle feeder is disadvantageous in that the upper and the lower opening and closing valve can not be simultaneously opened because the inside of the entire fine particle tank must not be put into a state of positive pressure by air of high pressure in the air feed pipe.

Therefore, while the fine particles filled in the intermediate section are being discharged into the lower section, it is impossible to open the upper opening and closing valve and fill the intermediate section with the fine particles sent from the upper section. As a result, when all fine particles filled in the intermediate section has been discharged into the lower section, it is impossible to discharge the fine particles into the lower section until the filling of the fine particles from the upper section into the intermediate section is finished. Therefore, the fine particles are intermittently fed into the air feed pipe, that is, it is impossible to feed the fine particles continuously.

In order to feed the fine particles continuously, the following arrangement may be provided. The intermediate section of the fine particle tank is extended, so that a quantity of fine particles discharged to the lower section is increased. Before all fine particles are discharged into the air feed pipe, new fine particles are filled in the intermediate space so that discharging stand by state is established. However, the above arrangement is disadvantageous in that it is necessary to extend volumes of the intermediate and the lower section, and the size of the fine particle tank is increased. As a result, the manufacturing cost is raised and further it becomes difficult to ensure the installation space, and furthermore, it becomes difficult to properly conduct maintenance on the device.

On the other hand, the conventional shot blasting device conducts polishing on a surface to be polished as follows. Particle-shaped grit fed from the fine particle feeder is sent into a high pressure air line and transported pneumatically to a blasting device for shot blasting attached to an end of the high pressure air line. Thus transported grit is strongly blasted out from the blasting device and made to collide with a surface to be polished, so that rust and coating can be peeled off from the surface to be polished. However, when the fine particle feeder in this shot blasting device is composed of the aforementioned conventional fine particle feeder, the size of the fine particle feeder is extended in the same manner as that described above, and further it is difficult to feed grit smoothly because of air pressure. Furthermore, in the conventional shot blasting device, it is difficult to recycle grit which has been used once.

SUMMARY OF THE INVENTION

An object of the present invention is to solve the above conventional problems, and to provide a fine particle feeder characterized in that: fine particles can be smoothly and positively fed so that the feeding efficiency can be enhanced high; the size of the device can be decreased; the manufacturing cost can be reduced; and the maintenance can be easily conducted on the device.

It is another object of the present invention to provide a shot blasting device in which grit can be smoothly transported and blown out by a compact and inexpensive device and further grit which has been used once can be recycled.

According to one aspect of the present invention, there is provided a fine particle feeder comprising: an upper chamber for storing fine particles; a plurality of intermediate chambers arranged below the upper chamber in the horizontal direction; a lower chamber arranged below the intermediate chambers, having a discharge port at the bottom thereof; an upper communicating port for communicating the upper chamber with each intermediate chamber; a lower communicating port for communicating each intermediate chamber with the lower chamber; a filling valve arranged in each upper communicating port; a feed valve arranged in each lower communicating port; an upper pressure equalizer pipe for communicating the upper chamber with each intermediate chamber, the pipe being different from the upper communicating ports; a lower pressure equalizer pipe for communicating each intermediate chamber with the lower chamber, the pipe being different from the lower communicating ports; an upper pressure control valve arranged in each upper pressure equalizer pipe, closed usually; a lower pressure control valve arranged in each lower pressure equalizer pipe, closed usually; means for opening a feed valve of the intermediate chamber(s) in which fine particles are accommodated and closing a filling valve of the intermediate chamber(s) so that the fine particles are fed from the intermediate chamber(s) into the lower chamber when the fine particles must be fed from the intermediate chamber(s) into the lower chamber, and for closing a feed valve of the remaining empty intermediate chamber and opening a filling valve in the intermediate chamber so that the fine particles are filled from the upper chamber into the intermediate chamber; and means, when the fine particles are moved between the upper and the intermediate chambers or the intermediate and the lower chambers, for temporarily opening a pressure control valve in the pressure equalizing pipe arranged between these two chambers so that pressures of these two chambers are made almost equal, wherein the fine particles are successively fed from the upper chamber to the intermediate chamber and the lower chamber, in turn, so as to continuously discharge the fine particles from the discharge port of the lower chamber.

A filling valve in either intermediate chamber is opened, and the fine particles are filled from the upper chamber into the intermediate chamber, so that the stand-by state in which the fine particles can be fed into the lower chamber is established. At this time, before the filling valve of either intermediate valve is opened, the upper pressure control valve of the upper pressure equalizer pipe connecting the upper chamber with the intermediate chamber to which the fine particles are fed is temporarily opened, and pressure in the intermediate chamber and pressure in the upper chamber are made almost equal to each other so that the fine particles can be smoothly fed. The upper pressure control valve is closed after the fine particles have been fed from the upper chamber into the intermediate chamber.

When the fine particles are fed outside the fine particle feeder after the fine particles have been filled into the intermediate chamber, in order to feed the fine particles smoothly into the lower chamber, as in the same manner as that described above, the lower pressure control valve of the lower pressure equalizer pipe connecting the intermediate chamber with the lower chamber is opened, and pressure in the intermediate chamber and pressure in the lower chamber are made almost equal to each other. Thereafter, the feed valve is opened and the fine particles are fed from the intermediate chamber into the lower chamber, and then the fine particles are discharged from the discharge port of the lower chamber. In the case where the feed valve is opened, the filling valve of the corresponding intermediate chamber is closed.

While the fine particles are being fed from either intermediate chamber into the corresponding lower chamber, the filling valve of the other intermediate chamber, which is in an empty state, is opened, and the fine particles are fed from the upper chamber into the intermediate chamber, so that the stand-by state in which the fine particles can be fed from the intermediate chamber into the lower chamber. For example, when all fine particles are fed from a certain intermediate chamber, the fine particles are fed from the intermediate chamber which has been put into the stand-by state, into the lower chamber. In this way, a plurality of intermediate chambers alternately feed the fine particles into the lower chamber. In other words, grit is filled and fed in the intermediate chambers repeatedly and alternately. On the other hand, the intermediate chamber into which grit is filled from the upper chamber is successively changed, and the intermediate chamber from which grit is fed into the lower chamber is successively changed. Due to the foregoing, the fine particles can be continuously, smoothly and positively fed from the upper chamber into the intermediate chamber and discharged from the intermediate chamber into the lower chamber.

According to the present invention, a plurality of intermediate chambers are arranged. Therefore, while the fine particles are being fed from either intermediate chamber into the corresponding lower chamber, the fine particles are filled from the upper chamber into the other intermediate chamber. Therefore, either of the intermediate chambers can be put into the stand-by state in which the fine particles can be fed into the lower chamber, and the fine particles can be continuously fed into the lower chamber. Further, when the fine particles are moved, pressure in each chamber is made equal by the pressure equalizer pipe. Accordingly, the fine particles can be smoothly fed. Therefore, a ratio of feeding fine particles can be greatly enhanced.

Further, since the fine particles are fed from a plurality of intermediate chambers into the lower chambers, the intermediate and the lower chamber can be made compact in design, that is, it is possible to reduce the size of the device. Furthermore, it is easy to conduct maintenance on the device, and the manufacturing cost can be reduced.

Preferably, the intermediate chambers comprise two chambers adjacent to each other, and the feed valve comprises a pivotable arm arranged in the lower chamber and a single valve body arranged at an end of the arm, the valve body selectively closing one of the lower communicating ports sealingly and opening the other lower communicating port, so that the closed lower communicating port, which has been closed by the valve body, and the opened lower communicating port are alternately and repeatedly changed when the arm is pivoted repeatedly.

Preferably, a sensor for detecting a quantity of fine particles accommodated in the lower chamber is arranged in the lower chamber, and the fine particles are fed from the intermediate chambers into the lower chamber when the quantity of fine particles detected by the sensor becomes smaller than a predetermined value.

Preferably, the filling valve comprises: a cylindrical body having a bottom, arranged below the corresponding upper communicating port, the top opening of the cylindrical body being larger than the corresponding upper communicating port; and a sealing board which protrudes like a flange shape from the corresponding upper communicating port above the outlet circumferential edge of the upper communicating port, and wherein the cylindrical body is pivotable between a position at which the opening circumferential edge of the cylindrical body is separated from a position immediately below the upper communicating port toward the outside so as to open the upper communicating port, and a position at which the opening circumferential edge of the cylindrical body comes tightly into contact with the sealing board so as to shut off the upper communicating port. In this case, preferably, an outer circumferential surface of the cylindrical body from the opening to the bottom is formed into an arc, the center of which coincides with a rotary shaft of the cylindrical body.

In the use of the filling valve having the above structure, when the cylindrical body is rotated onto the upper communicating port side of grit and the opening circumferential edge of the cylindrical body is made to come tightly into contact with the sealing board arranged round the upper communicating port, the upper communicating port can be sealingly closed.

When the opening circumferential edge of the cylindrical body is made to tightly come into contact with the sealing board located at a position on the outer circumference of the upper communicating port where no fine particles exist, there is no possibility that the fine particles are interposed between the opening circumferential edge of the cylindrical body and the outer circumferential surface of the upper communicating port. Therefore, the upper communicating port can be positively and sealingly closed.

The fine particles are accumulated in the form of a mountain, the top of which is below the upper communicating port. Therefore, the accumulated fine particles are not contacted with the sealing board, and the opening circumferential edge of the cylindrical body can be tightly contacted with the sealing board. The cylindrical body is moved in the fine particles in such a manner that the fine particles in the course of movement of the cylindrical body are taken into the cylindrical body, that is, the cylindrical body does not push and move the fine particles. Therefore, the cylindrical body can be smoothly moved in the fine particles so that it can be put onto a closing motion.

Due to the foregoing, even if the fine particles are accumulated close to the upper communicating port, the cylindrical body can sealingly shut up the upper communicating port without interposing the fine particles.

When the upper communicating port for the fine particles must be opened, the cylindrical body is rotated in such a manner that the cylindrical body is separated from the upper communicating port. Due to the above operation, the upper communicating port can be opened. Since the cylindrical body is tilted in the process of rotation, the fine particles taken into the cylindrical body are discharged outside by the rotation.

When the outer circumferential surface of the cylindrical body is formed into an arc, the center of which coincides with the rotary shaft of the cylindrical body, the cylindrical body can be moved in the fine particles under a condition of low resistance. Therefore, the drive force for driving the cylindrical body can be reduced.

Preferably, the discharge port of the lower chamber is connected to a transport pipe in which air at high pressure is transported, so that fine particles discharged from the discharge port are pneumatically transported in the transport pipe by air at high pressure.

According to another aspect of the present invention, there is provided a shot blasting device comprising: a fine particle feeder comprising: an upper chamber for storing fine particles; a plurality of intermediate chambers arranged below the upper chamber in the horizontal direction; a lower chamber arranged below the intermediate chambers, having a discharge port at the bottom thereof; an upper communicating port for communicating the upper chamber with each intermediate chamber; a lower communicating port for communicating each intermediate chamber with the lower chamber; a filling valve arranged in each upper communicating port; a feed valve arranged in each lower communicating port; an upper pressure equalizer pipe for communicating the upper chamber with each intermediate chamber, the pipe being different from the upper communicating ports; a lower pressure equalizer pipe for communicating each intermediate chamber with the lower chamber, the pipe being different from the lower communicating ports; an upper pressure control valve arranged in each upper pressure equalizer pipe, closed usually; a lower pressure control valve arranged in each lower pressure equalizer pipe, closed usually; means for opening a feed valve of the intermediate chamber(s) in which fine particles are accommodated and closing a filling valve of the intermediate chamber(s) so that the fine particles are fed from the intermediate chamber into the lower chamber when the fine particles must be fed from the intermediate chamber(s) into the lower chamber, and for closing a feed valve of the remaining empty intermediate chamber and opening a filling valve in the intermediate chamber so that the fine particles is filled from the upper chamber into the intermediate chamber; and means, when the fine particles are moved between the upper and the intermediate chambers or the intermediate and the lower chambers, for opening a pressure control valve in the pressure equalizing pipe arranged between these two chambers so that pressures of these two chambers are made almost equal wherein the fine particles are successively fed from the upper chamber to the intermediate chamber and the lower chamber, in turn, so as to continuously discharge the fine particles from the discharge port of the lower chamber, wherein a discharge port of the lower chamber is connected to a transport pipe in which air of high pressure is transported, so that fine particles discharged from the discharge port is pneumatically transported in the transport pipe by air of high pressure, the fine particle comprising fine particle-shaped grit for shot blasting; a shot device for shot blasting, having a shot port for shot grit and a discharging port, the shot port being connected to a discharge port of the transport pipe of the fine particle feeder; suction means, connected to the discharge port of the shot device for shot blasting, for sucking air from the shot device for shot blasting; separation means, arranged between the shot device for shot blasting and the suction means, for separating grit from the inflowing air and for returning the separated grit into the upper chamber; and removing means arranged between the separation means and the suction means for removing dust from the inflowing air.

Grit of fine particles dropping from the discharge port of the lower chamber of the fine particle feeder is sent to the air transport pipe and then transported to the shooting device by air at high pressure in the air transport pipe, where the grit is blown out onto a wall surface to be polished. When the grit collides with the wall surface, rust and coating are peeled off from the wall surface. In this way, the wall surface is polished. The grit blown out from the shooting device and small pieces of rust and coating peeled off from the wall surface are sucked from the discharge port into a hose. Pressure of air in the hose is kept negative by an air suction device. Therefore, the grit and pieces of rust, coating and dust peeled off from the wall surface are sucked by the negative pressure and sent into the upper chamber of the fine particle feeder. In the upper chamber, the heavy grit drops and moves through the intermediate and the lower chamber. Then, the grit is sent to the air transport pipe and circulated again. On the other hand, dust and small pieces of coating and rust are sent to the following dust collector together with a current of suction air and caught by a filter. Therefore, only air is sent to the air suction device. Due to the foregoing, operation of shot blasting can be smoothly and positively carried out, and further the shot blasting device can be made compact and the manufacturing cost can be reduced.

BRIEF DESCRIPTION OF THE DRAWINGS

FIG. 11 is a schematic illustration showing the structure of right and left filling valves in the second embodiment;

BEST MODE FOR CARRYING OUT THE INVENTION

Figure 1:
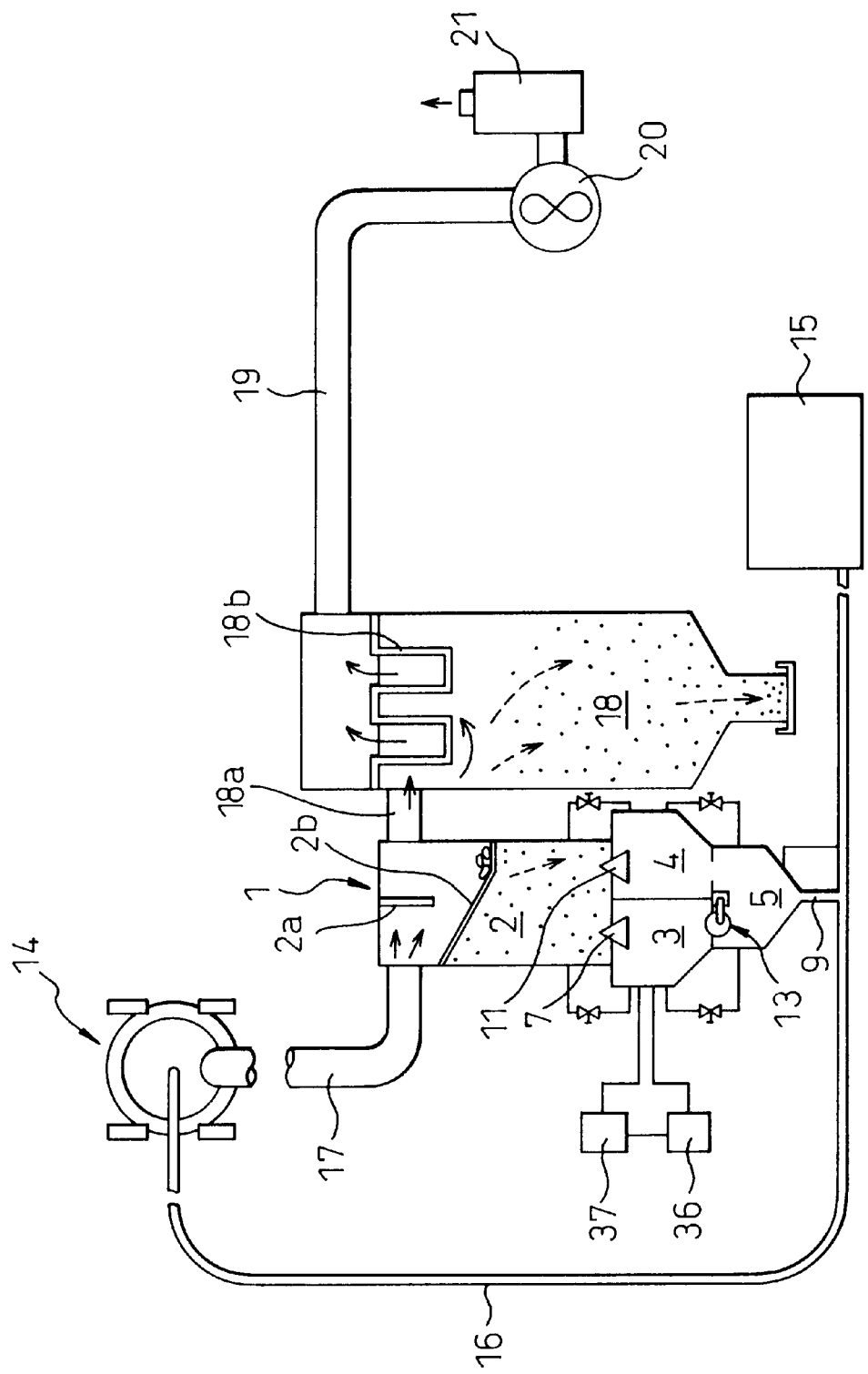
FIG. 1 is a schematic illustration showing an overall shot blasting device of the first embodiment of the present invention.
Figure 2:
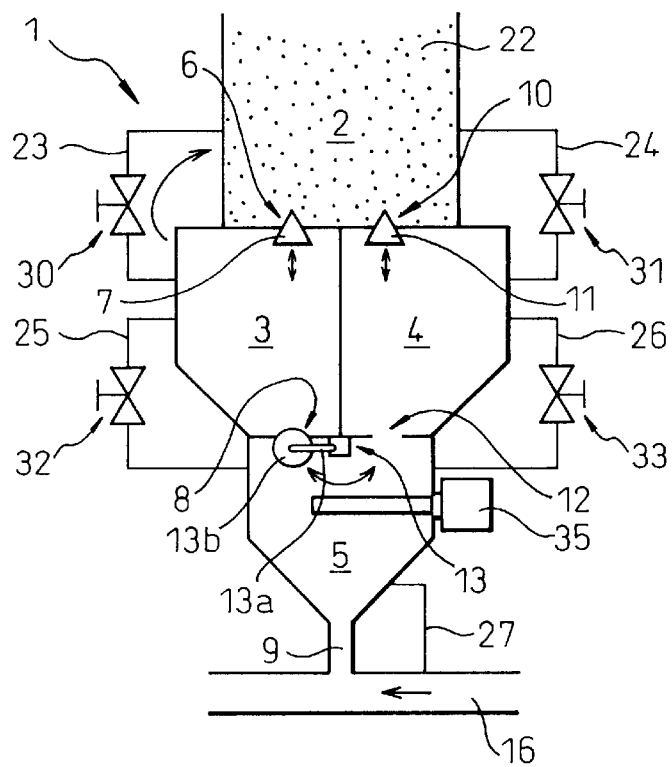
FIGS. 2 to 8 are views for explaining the operation of the inner structure of a grit tank in the first embodiment.

Referring to FIGS. 1 to 10B, the first embodiment will be explained below.

In FIGS. 1 to 10B, reference numeral 1 designates a grit tank for storing fine particle-shaped grit 22 which is used for shot blasting and consists a of fine particles. An inner space in the grit tank 1 is partitioned into three sections in the vertical direction. The upper section forms an upper chamber 2, the intermediate section forms an intermediate chamber, and the lower section forms a lower chamber 5. The intermediate chamber is partitioned into a left intermediate chamber 3 which is located on the left in the drawing, and a right intermediate chamber 4 which is located on the right in the drawing. The left intermediate chamber 3 and the right intermediate chamber 4 are arranged in the horizontal direction in order. In the inner space of the upper chamber 2, there are provided a baffle plate 2a arranged at an upper position and a wire net 2b for preventing pieces of trash, the sizes of which are large, from dropping downward. In this connection, the intermediate space may be partitioned into three or more sections, to form three or more intermediate chambers. However, it is common that the number of the intermediate chambers is two.

A left upper communicating port 6 penetrates a bottom wall of the upper chamber 2 and a top wall of the left intermediate chamber 3, so that the upper chamber 2 and the left intermediate chamber 3 can be communicated with each other. In this left upper communicating port 6, there is provided an electrical control type pneumatic left filling valve 7 for sealingly closing the left upper communicating port 6. A left lower communicating port 8 penetrates a bottom wall of the left intermediate chamber 3 and a top wall of the lower chamber 5, so that the left intermediate chamber 3 and the lower chamber 5 can be communicated with each other. Further, the lower chamber 5 is connected to a transport pipe 16 via a discharge port 9 extending from the bottom wall of the lower chamber 5.

Figure 9:
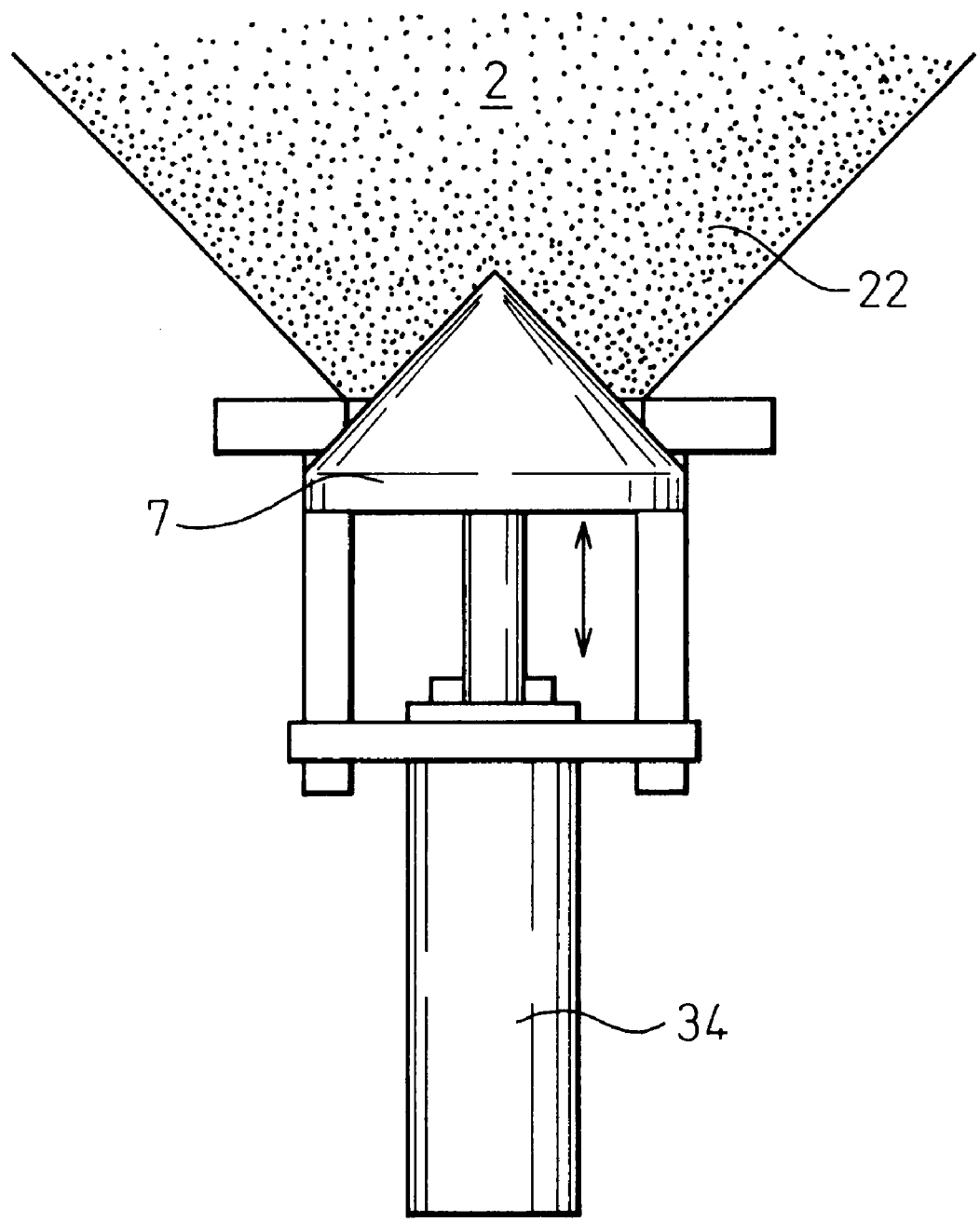
FIG. 9 is a view showing the structure of a left filling valve in the first embodiment.

In the same manner, a right upper communicating port 10 penetrates a bottom wall of the upper chamber 2 and a top wall of the right intermediate chamber 4, so that the upper chamber 2 and the right intermediate chamber 4 can be communicated with each other. In this right upper communicating port 10, there is provided an electrical control type pneumatic right filling valve 11 for sealingly closing the right upper communicating port 10. A right lower communicating port 12 penetrates a bottom wall of the right intermediate chamber 4 and a top wall of the lower chamber 5, so that the right intermediate chamber 4 and the lower chamber 5 can be communicated with each other. In this connection, the left filling valve 7 and the right filling valve 11 are respectively driven by the corresponding electrical control type pneumatic cylinders 34 as shown in FIG. 9. In this case, when the valve body is raised, the left upper communicating port 6 or the right upper communicating port 10 is shut off, and when the valve body is lowered, the left upper communicating port 6 or the right upper communicating port 10 is opened.

In the lower chamber 5, there is provided a change-over type electrical control pneumatic feed valve 13. This feed valve 13 includes an arm 13a and a single spherical valve body 13b attached to a front end of the arm 13a. A rear end of the arm 13a is pivotally attached to a rotational shaft extending in the horizontal direction, wherein this rotational shaft is provided on a top wall of the lower chamber 5 or a lower surface of a bottom wall of the left intermediate chamber 3 and the right intermediate chamber 4. The valve body selectively and sealingly closes one of the left lower communicating port 8 of the left intermediate chamber 3 and the right lower communicating port 12 of the right intermediate chamber 4 and opens the other. Alternatively, separate feed valves may be respectively provided for the left lower communicating port 8 and the right lower communicating port 12, and these separate feed valves may be controlled so that one of the left lower communicating port 8 and the right lower communicating port 12 can be selectively opened and the other can be selectively shut off.

The shot blasting device is provided with a grit blasting device 14 for blasting grit. This grit blasting device 14 is provided with a grit blasting port 14a and a grit discharging port 14b. The grit blasting port 14a is connected to an outlet of the air feed device 15, which feeds air of high pressure, via a transport pipe 16, and the discharging port 14b is connected to an upper space of the upper chamber 2 of the grit tank 1 via a recovery pipe 17.

The upper space of the upper chamber 2 is further connected to a dust collector 18 via a first connecting pipe 18a. An inner space of the dust collector 18 is divided into an upper space and a lower space by a filter 18b. This first connecting pipe 18a is open to the lower space of the dust collector 18. The upper space of the dust collector 18 is connected to a suction side of the air suction device 20 composed of a blower via the second connecting pipe 19. Accordingly, grit 22, air and fine particle-shaped adhesive materials, which have been peeled off, are recovered into the recovery pipe 17 via the discharging port 14b and then sent to the upper chamber 2. In this connection, the discharge side of the air suction device 20 is connected to a silencer 21.

A left upper pressure equalizer pipe 23, by which the upper chamber 2 and the left intermediate chamber 3 are communicated with each other, is arranged separately from the left upper communicating port 6. A right upper pressure equalizer pipe 24, by which the upper chamber 2 and the right intermediate chamber 4 are communicated with each other, is arranged separately from the right upper communicating port 10. A left lower pressure equalizer pipe 25, by which the left intermediate chamber 3 and the lower chamber 5 are communicated with each other, is arranged separately from the left lower communicating port 8. A right lower pressure equalizer pipe 26, by which the right intermediate chamber 4 and the lower chamber 5 are communicated with each other, is arranged separately from the right lower communicating port 12. Further, a lowermost pressure equalizer pipe 27, by which the lower chamber 5 and the transport pipe 16 are communicated with each other, is arranged separately from the discharging port 9.

There are respectively provided a left upper pressure control valve 30, a right upper pressure control valve 31, a left lower pressure control valve 32 and a right lower pressure control valve 33 in the left upper pressure equalizing pipe 23, the right upper pressure equalizing pipe 24, the left lower pressure equalizing pipe 25 and the right lower pressure equalizing pipe 26. Each pressure control valve is composed of an electrical control type pneumatic valve.

Each control section 36, 37 is composed of a digital computer, which includes ROM (read-only-memory), RAM (random access memory), CPU (microprocessor), B-RAM (backup RAM) connected to the power source at all times, input port and output port, wherein these components are connected to each other via the bidirectional bus. In the lower chamber 5, there is provided a level gauge 35 which generates an output signal, for example, when a level of grit 22 in the lower chamber 5 becomes lower than a predetermined setting level. The output signal of the level gauge 35 is inputted into an input port of the control section 36 via an AD converter. Output ports of the control section 36 are connected to the left filling valve 7, right filling valve 11 and feed valve 13 via the respectively corresponding drive circuits. Accordingly, opening and closing of the left filling valve 7, right filling valve 11 and feed valve 13 are electrically controlled by the control section 36. On the other hand, output ports of the control section 37 are connected to the pressure control valves 30, 31, 32, 33 via the respectively corresponding drive circuits. Accordingly, opening and closing of the pressure control valves 30, 31, 32, 33 are electrically controlled by the control section 37.

As shown in FIG. 1, in the first embodiment, the grit 22 stored in the upper chamber 2 of the grit tank 1 is discharged into the lower chamber 5 via the left intermediate chamber 3 and the right intermediate chamber 4, and the grit is made to drop from the discharge port of the lower chamber 5 into the lower transport pipe 16 and then mixed with air at high pressure and transported to the grit shooting device 14 by the air at high pressure.

Next, the inside of the grit tank 1 is explained below.

First, in order to feed the grit 22 from the upper chamber 2 into the left intermediate chamber 3, the arm 13a of the feed valve 13 is rotated onto the side of the left intermediate chamber 3, so that the valve body 13b can sealingly close the left lower communicating port 8 of the left intermediate chamber 3. Next, the left upper pressure control valve 30 is opened, so that the left upper pressure equalizing pipe 23 can be communicated and the pressure in the upper chamber 2 and the pressure in the left intermediate chamber 3, to which the grit 22 is fed, can be made uniform.

Figure 3:
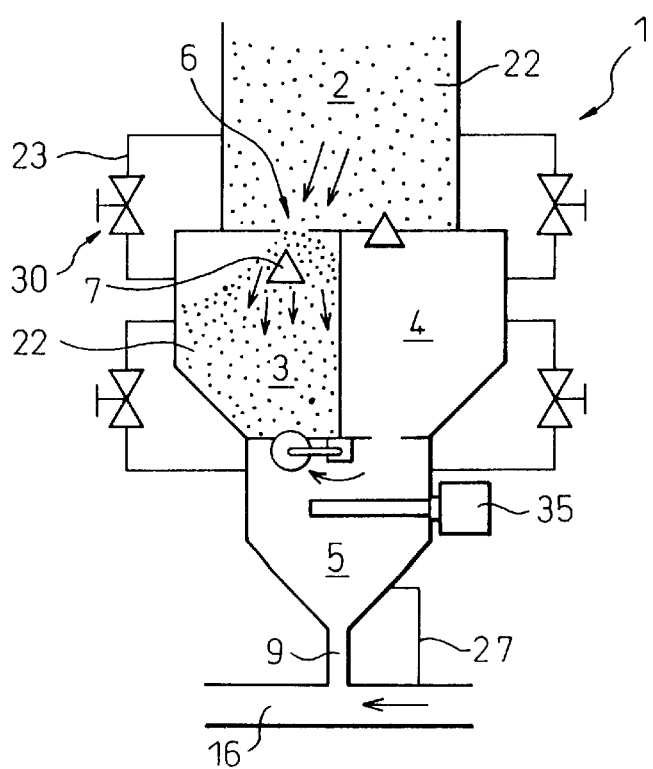
Figure 4:
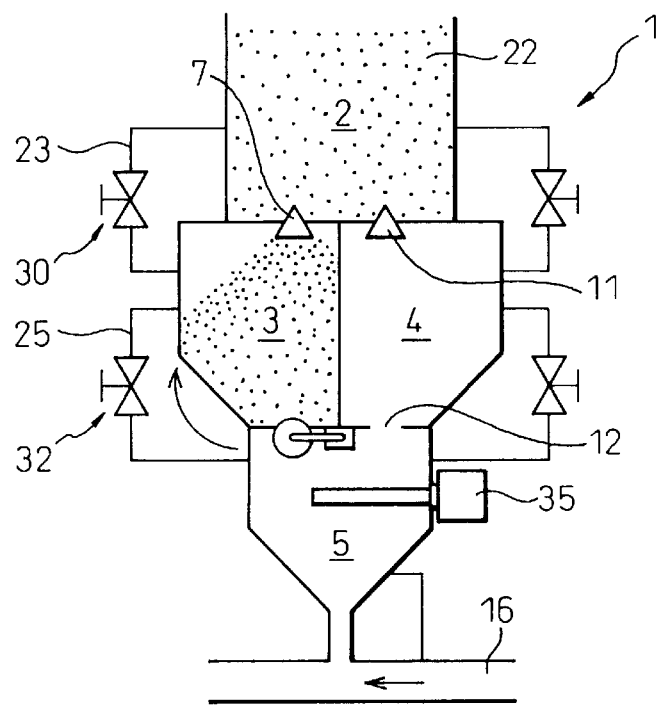

Next, the left filling valve 7 is opened and the grit 22 is made to drop from the upper chamber 2 into the left intermediate chamber 3. Due to the foregoing, the grit 22 is filled into the left intermediate chamber 3 as shown in FIG. 3. When the filling of the grit 22 is completed, the left filling valve 7 and the left upper pressure control valve 30 are closed as shown in FIG. 4.

After that, in order to discharge the grit 22 from the left intermediate chamber 3 into the lower chamber 5, the left lower pressure control valve 32 is opened so as to open the left lower pressure equalizing pipe 25, and the pressure in the left intermediate chamber 3 and the pressure in the lower chamber 5, to which the grit 22 is fed, can be made uniform. Next, the arm 13a of the feed valve 13 is rotated onto the side of the right intermediate chamber 4, so that the left lower communicating port 8 of the left intermediate chamber 3 is opened, and the right lower communicating port 12 in the right intermediate chamber 4 is sealingly closed.

Figure 5:
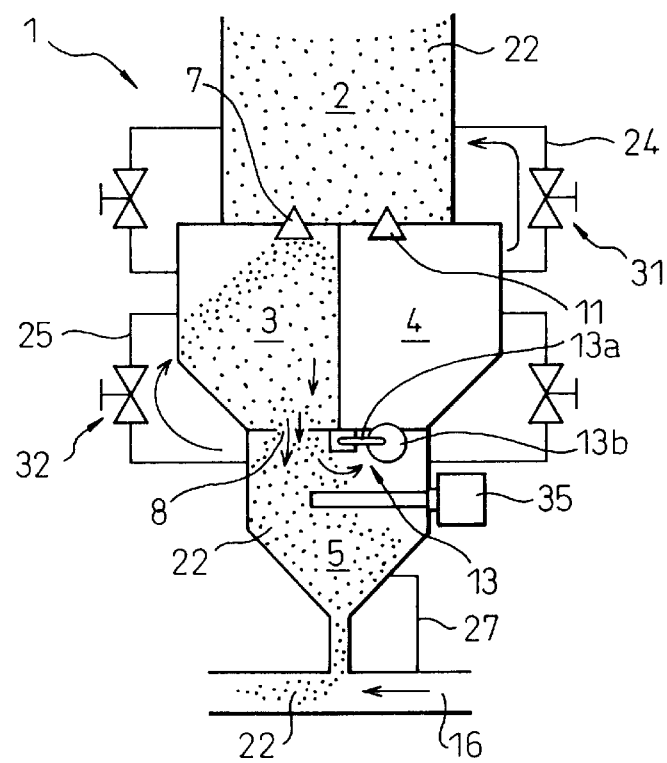

Due to the foregoing, the grit 22 is made to drop from the left intermediate chamber 3 into the lower chamber 5 and discharged. The pressure in the lower chamber 5 is made to be close to the pressure in the transport pipe 16 by the lowermost pressure equalizing pipe 27. Therefore, the grit 22 can be made to drop smoothly from the lower chamber 5 into the transport pipe 16 as shown in FIG. 5.

Figure 6:
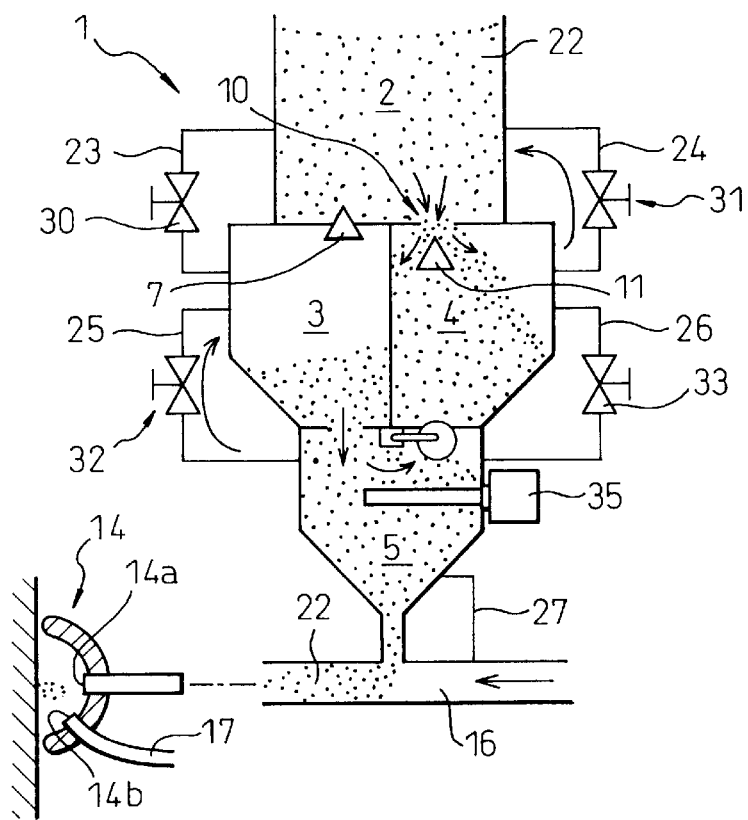

Further, after the right lower communicating port 12 in the right intermediate chamber 4 has been closed by the feed valve 13, while the grit 22 is being discharged from the left intermediate chamber 3 into the lower chamber 5, in the same manner as that described before, the right upper pressure control valve 31 is opened, so that the pressure in the right intermediate chamber 4 is made to be equal to the pressure in the upper chamber 2, and further, the right filling valve 11 is opened and the grit 22 is filled from the upper chamber 2 into the right intermediate chamber 4. As a result, immediately after the feeding of the grit 22 from the left intermediate chamber 3 into the lower chamber 5 has started, the right intermediate chamber 4 is put into a feeding stand-by state in which the grit 22 can be discharged from the right lower chamber 4 into the lower chamber 5 as shown in FIG. 6.

After the filling of the grit 22 from the upper chamber 2 into the right intermediate chamber 4 has been completed, the right filling valve 11 and the right upper pressure control valve 31 are closed in the same manner as that described before, as shown in FIG. 7.

Figure 7:
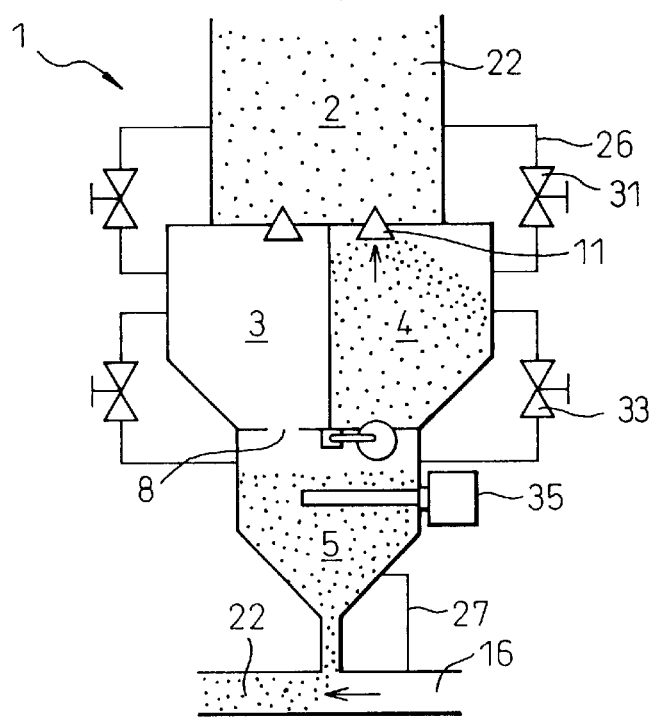
Figure 8:
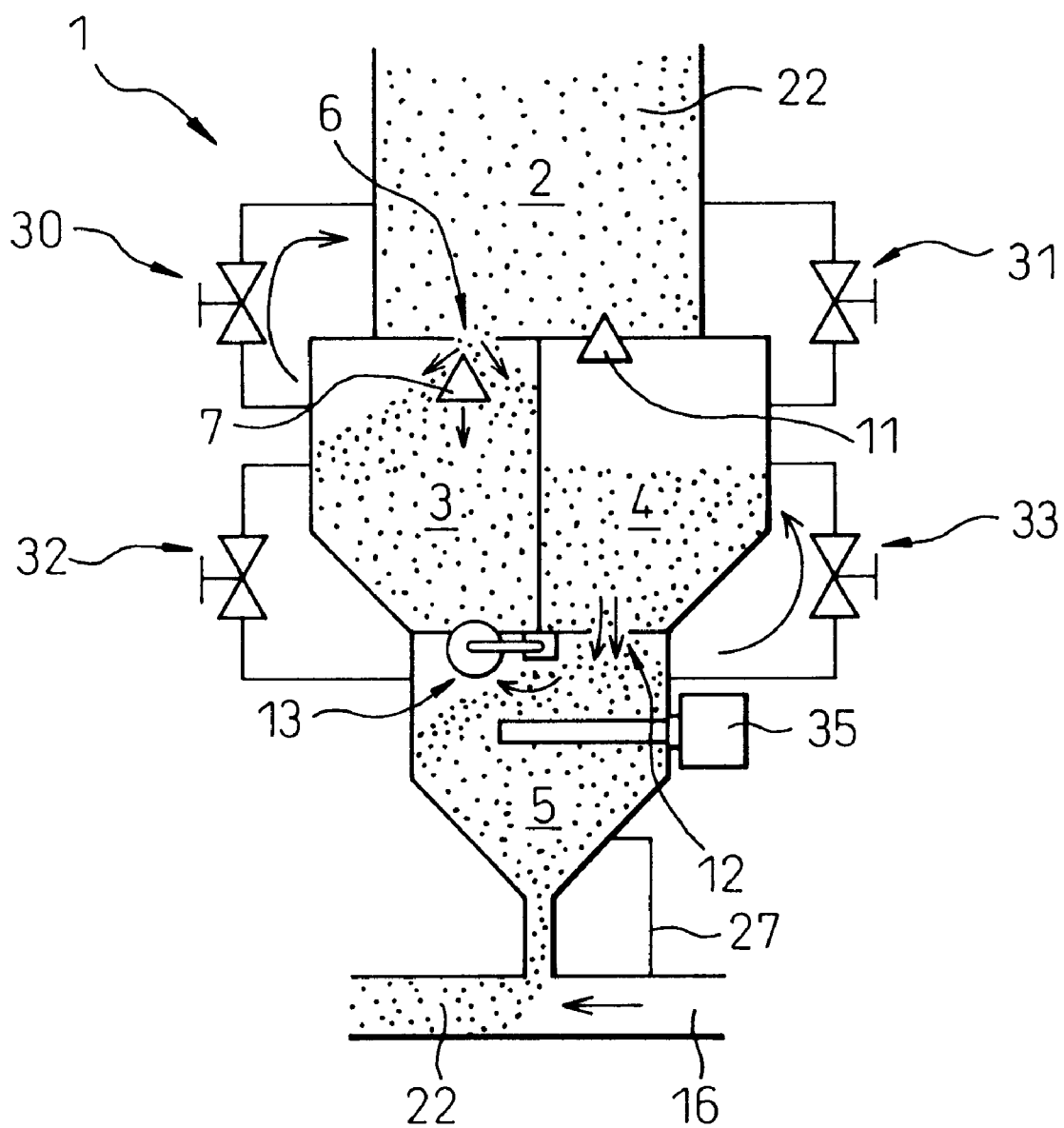

Even if the left intermediate chamber 3 becomes almost empty, the left lower communicating port 8 of the left intermediate chamber 3 is kept open, and the right lower communicating port 12 of the right intermediate chamber 4 is kept closed as shown in FIG. 7. Next, when the level of the grit 22 in the lower chamber 5 becomes lower than a predetermined setting level, the right lower pressure control valve 33 is opened, so that the pressure in the right intermediate chamber 4 and the pressure in the lower chamber 5 can be made uniform. After that, the arm 13a of the feed valve 13 is rotated onto the left intermediate chamber 3, so that the right lower communicating port 12 in the right intermediate chamber 4 can be opened and the left lower communicating port 8 in the left intermediate chamber 3 can be closed. Due to the foregoing, the grit 22 is discharged from the right intermediate chamber 4 into the lower chamber 5.

While the grit 22 is being discharged from the right intermediate chamber 4 into the lower chamber 5, the grit 22 is filled from the upper chamber 2 into the left intermediate chamber 3 in the same manner as that described before, as shown in FIG. 8.

The above operation is repeated, and thus the grit 22 is fed into the lower chamber 5 alternately via the left intermediate chamber 3 and the right intermediate chamber 4 while the pressure is shut off without simultaneously communicating the upper chamber 2 with the lower chamber 5.

Immediately after the feeding of the grit 22 from one of the left intermediate chamber 3 and the right intermediate chamber 4 into the lower chamber 5 has been completed, the grit 22 can be fed from the other intermediate chamber into the lower chamber 5. Therefore, the grit 22 can be smoothly and effectively discharged from the discharge port 9 of the lower chamber 5.

The grit 22 fed from the discharge port 9 of the grit tank 1 into the transport pipe 16 is mixed with air at high pressure in the transport pipe 16 and transported to the grit shot device 14 by air. Then the grit 22 is shot out from the grit shot port 14a of the grit shot device 14 and collides with a surface to be polished at high speed, so that the surface can be polished. Fine particle-shaped adhered materials, which have been peeled off from the surface to be polished, are discharged from the discharge port 14b together with the grit 22 and air, and sent to the upper chamber 2 in the grit tank 1 via the recovery pipe 17 and collides with the baffle plate 2a. The grit 22 and the heavy matter peeled off from the surface drop into the upper chamber 2 by their own weight. In this case, the large matter peeled off from the surface and the frash are caught by the wire net 2b, and the grit 22 passes through the wire net 2b and reaches the grit storage section in the upper chamber 2. That is, the grit sent from the shooting device 14 to the upper chamber 2 is separated from air and returned to the grit storage section in the upper chamber 2. Air recovered into the upper chamber 2 passes through the dust collector 18 via the first connecting pipe 18a. While it is passing through the dust collector 18, dust is removed from air by the filter 18b and recovered into the dust collector 18. After dust has been removed, the air is sucked by the air suction device 20 via the second connecting pipe 19.

In this way, the grit 22 is repeatedly used so as to polish the surface to be polished.

Figure 10A:
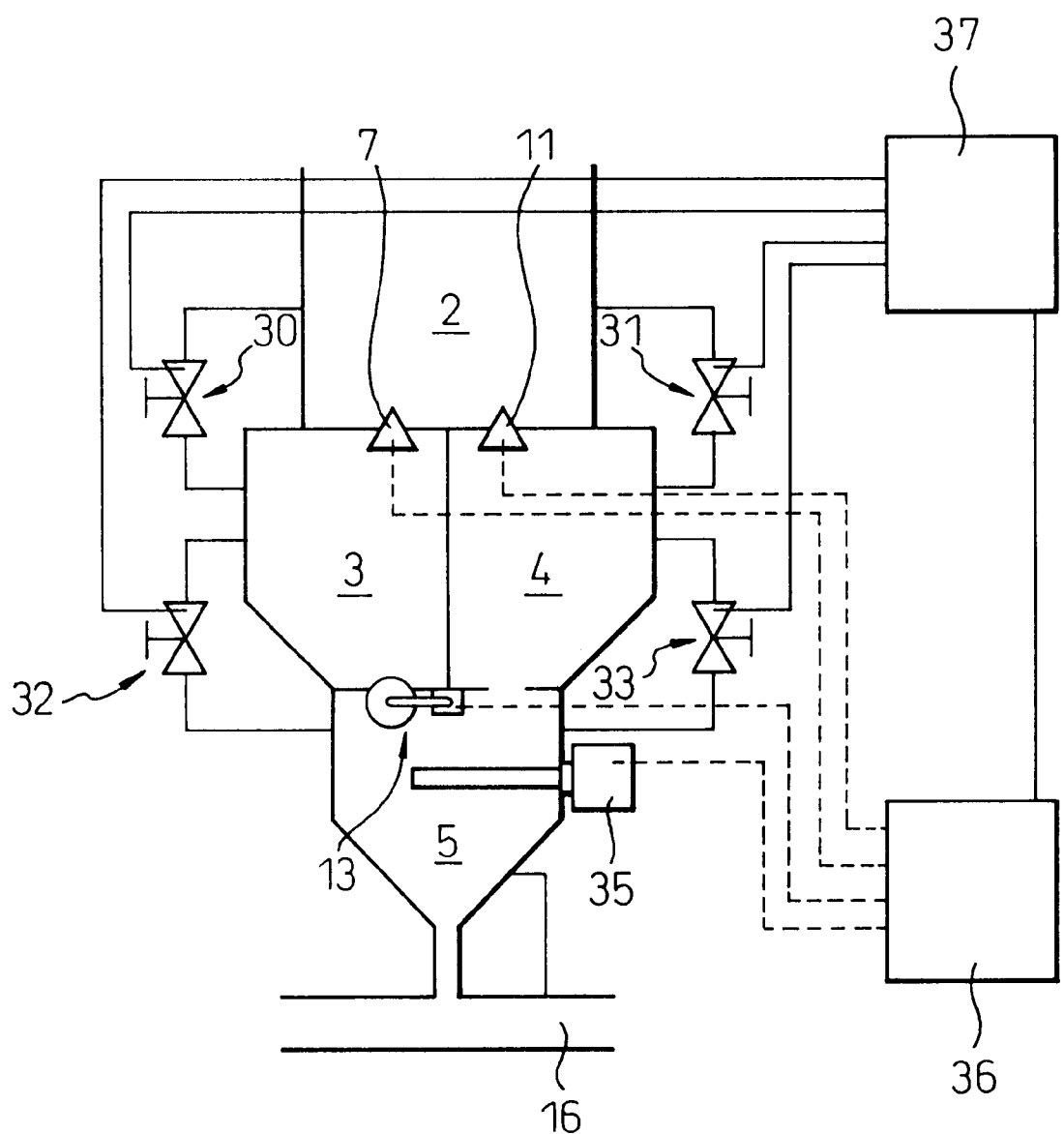
FIG. 10A is a schematic illustration showing control of filling valves, a feed valve and pressure control valves in the first embodiment.
Figure 10B:
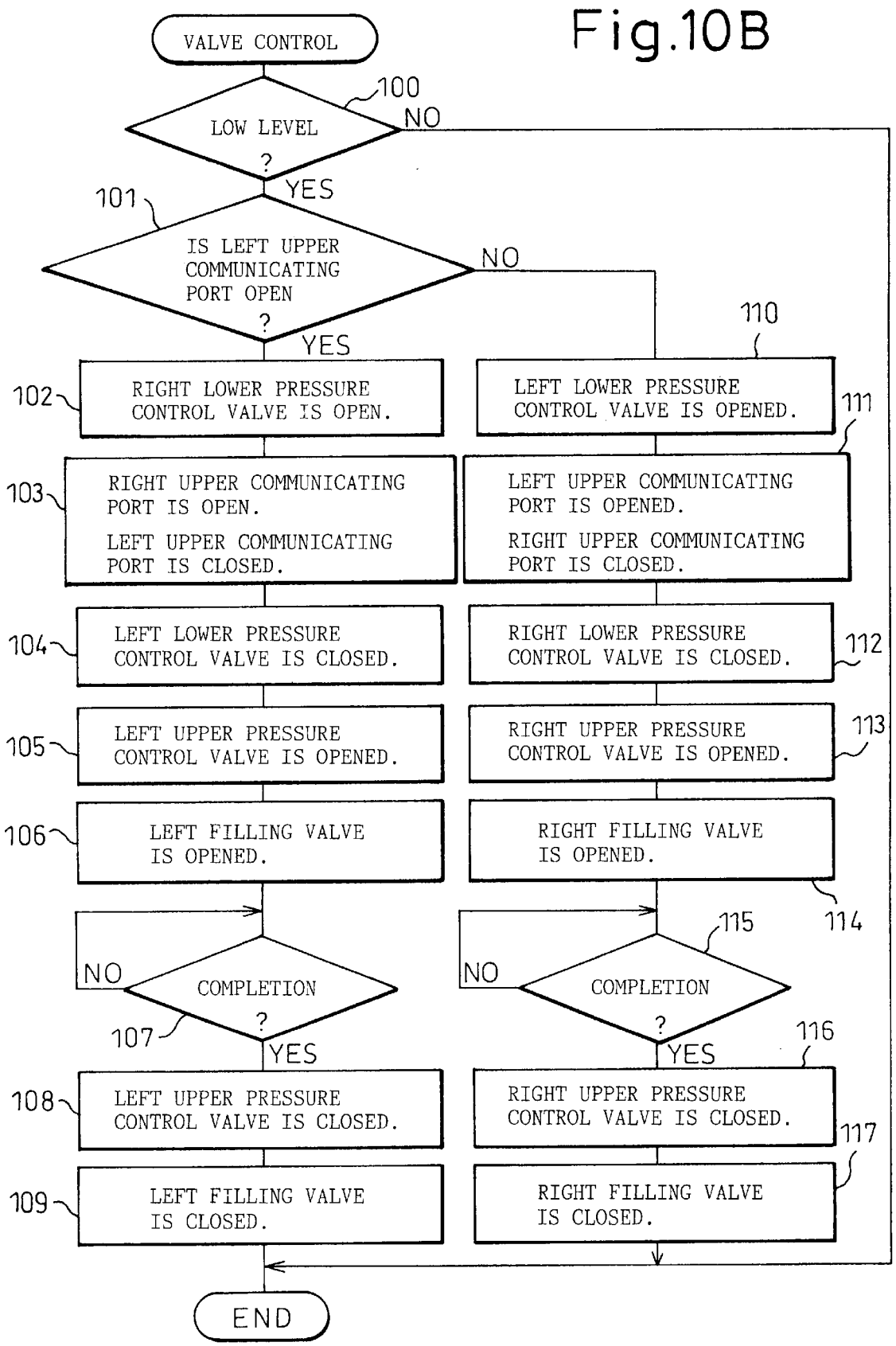
FIG. 10B is a flow chart for controlling the filling valves, feed valve and pressure control valves in the first embodiment.
Figure 12:
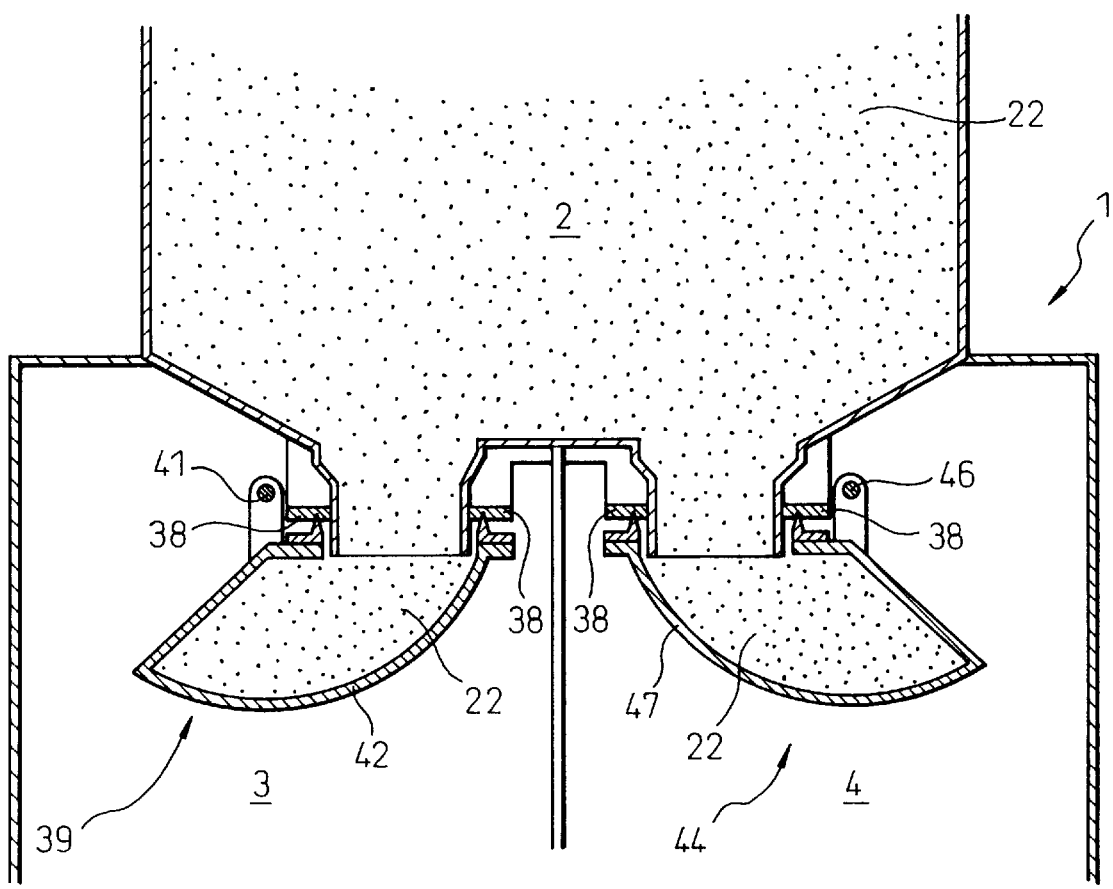
FIG. 12 is a longitudinal cross-sectional view of the right and left filling valves in the second embodiment.
Figure 13:
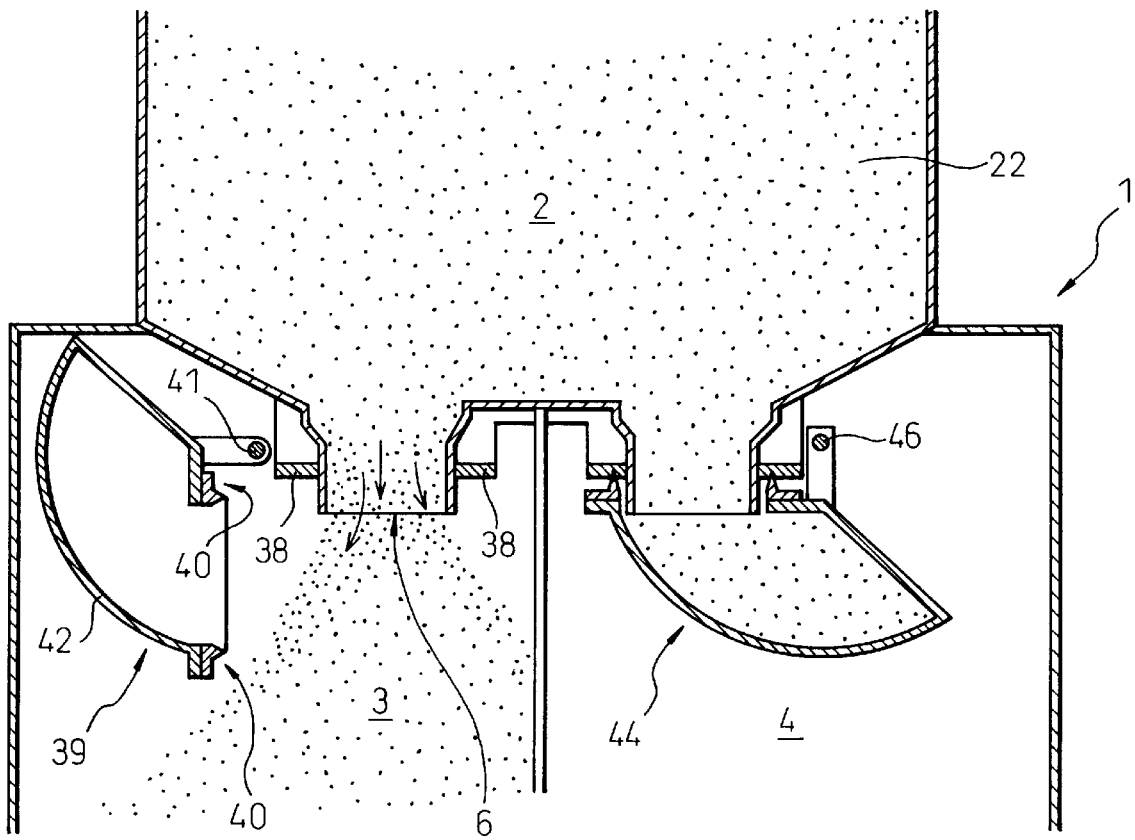
FIG. 13 is a schematic illustration showing operation of the left filling valve in the second embodiment.
Figure 14:
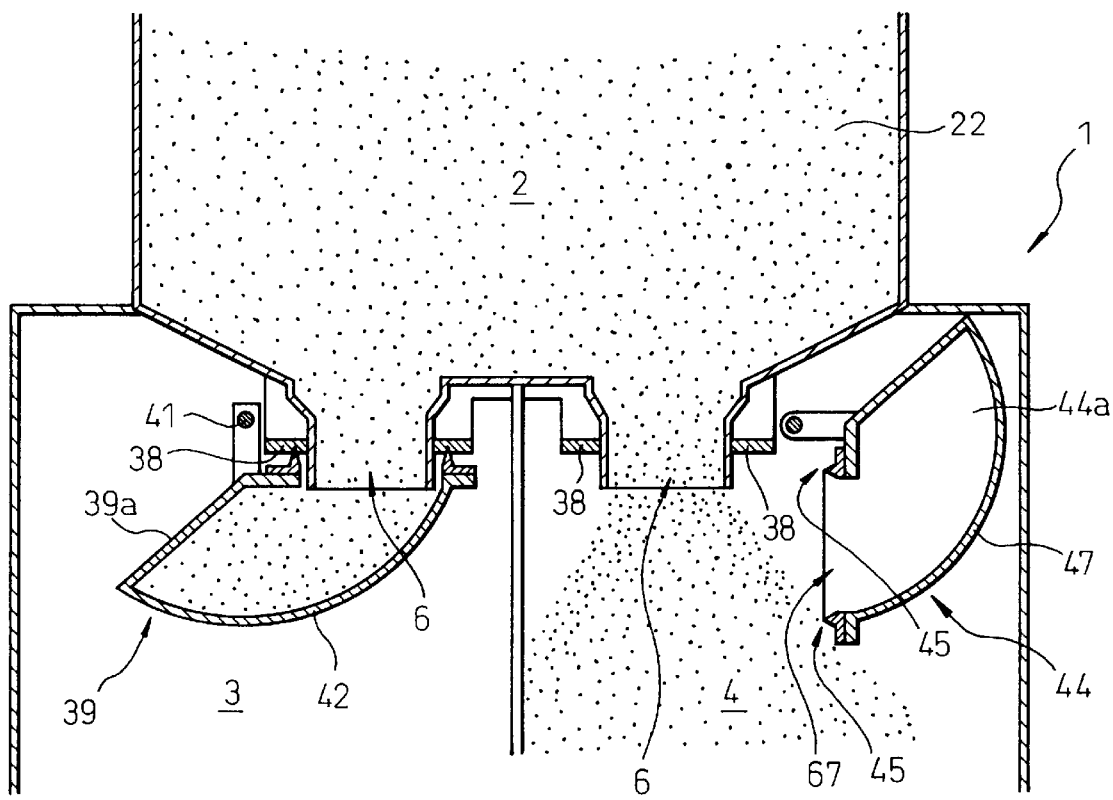
FIG. 14 is a schematic illustration showing operation of the right filling valve in the second embodiment.
Figure 15:
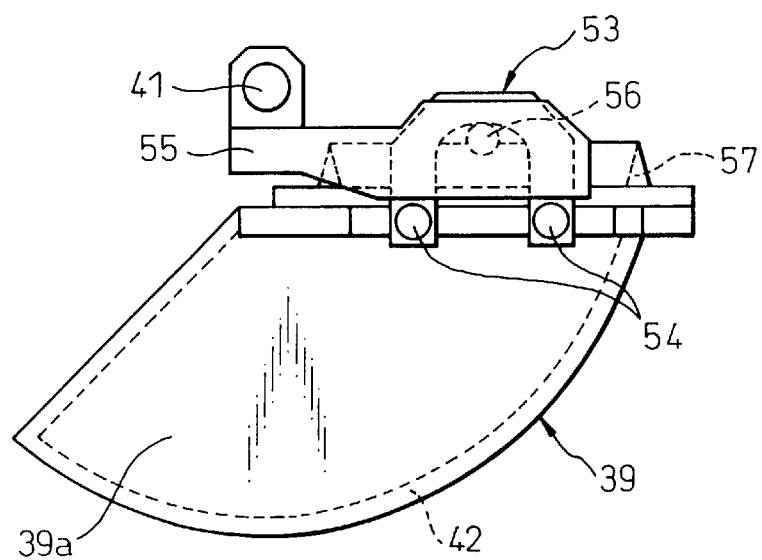
FIG. 15 is a front view showing the left filling valve.
Figure 16:
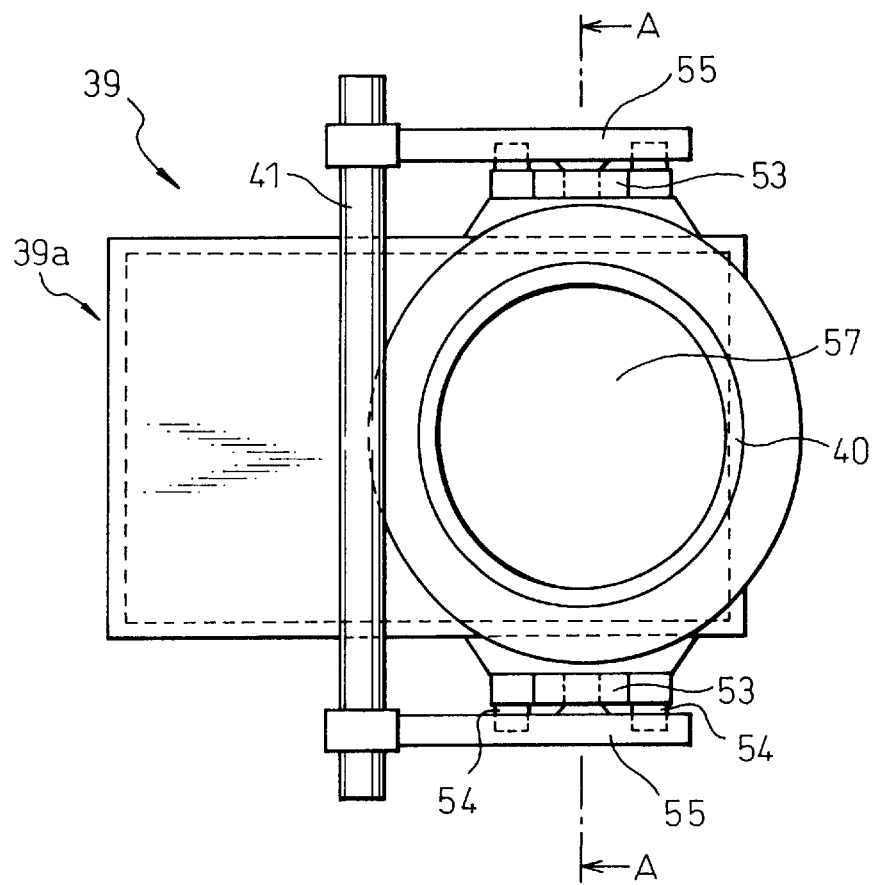
FIG. 16 is a plan view of the left filling valve in FIG. 15.
Figure 17:
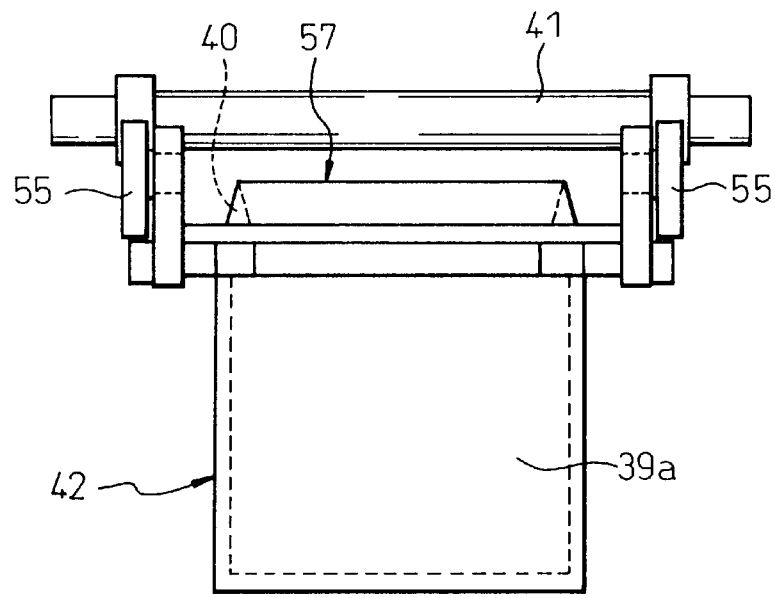
FIG. 17 is a side view of the left filling valve in FIG. 15.
Figure 18:
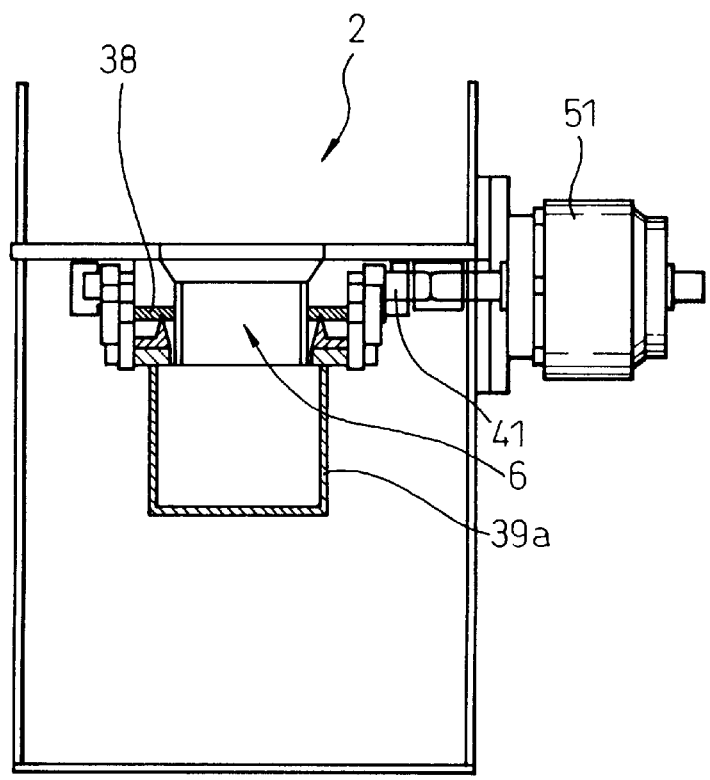
FIG. 18 is a cross-sectional view of the left filling valve taken on line A—A in FIG. 16.

FIG. 10B is a view showing a routine for controlling each filling valve, feed valve and pressure control valve in the first embodiment. This routine is repeatedly carried out each predetermined setting time.

Referring to FIG. 10B, in step 100, it is discriminated whether a level of grit in the lower chamber 5 detected by the level gauge 35 is lower than a setting level. When the detected level is higher than the setting level, the processing cycle is ended. When the detected level is lower than the setting level, the program proceeds to step 101, and it is discriminated whether the left upper communicating port 6 is open at present. When the left upper communicating port 6 is open, the program proceeds to step 102, and the right lower pressure control valve 31 is opened. Next, in step 103, the arm 13a is rotated and the right upper communicating port 10 is opened, and at the same time the left upper communicating port 6 is shut off. Next, in step 104, the left lower pressure control valve 32 is closed. Next, in step 105, the left upper pressure control valve 30 is opened. Next, in step 106, the left filling valve 7 is opened. Next, in step 107, it is discriminated whether the grit is filled from the upper chamber 2 into the left intermediate chamber 3. For example, when about 70% of the volume of each intermediate chamber 3, 4 is filled with the grit, it is possible to judge that the filling of grit has been completed. After the completion of the filling of grit, the program proceeds to step 108, and the left upper pressure control valve 30 is closed. Next, in step 109, the left filling valve 7 is closed.

On the other hand, when the right upper communicating port 10 is open in step 101, the program proceeds to step 110, and the left lower pressure control valve 32 is opened. Next, in step 111, the arm 13a is rotated, so that the left upper communicating port 6 is opened, and at the same time, the right upper communicating port 10 is shut off. Next, in step 112, the right lower pressure control valve 33 is closed. Next, in step 113, the right upper pressure control valve 31 is opened. Next, in step 114, the right filling valve 11 is opened. Next, in step 115, it is discriminated whether the filling of grit from the upper chamber 2 into the right intermediate chamber 4 is completed. In the case of completion of the filling, the program proceeds to step 116, and the right upper pressure control valve 31 is closed. Next, in step 117, the right filling valve 11 is closed.

Next, referring to FIGS. 11 to 18, the second embodiment will be explained below.

A different point in the second embodiment, compared to the first embodiment, is the structure of the left filling valve 39 and the right filling valve 44. Other points of the structure, mode of operation and effect thereof are the same as those of the first embodiment. Therefore, the explanations are omitted here. In this connection, in the first and the second embodiments, like reference characters designate similar components throughout the drawings.

Referring to FIGS. 11 to 18, there is provided a sealing board 38, which protrudes like a flange, and is located around the left upper communicating port 6, in an upper portion of the lower circumferential edge of the left upper communicating port 6. Also, there is provided a sealing board 38, which protrudes like a flange and is located around the right upper communicating port 10, in an upper portion of the lower circumferential edge of the right upper communicating port 10. In a portion close to the left upper communicating port 6, there is provided a left filling valve 39 having a rigid cylindrical body 39a. At a top portion of the cylindrical body 39a, there is provided an opening circumferential edge 40, the sectional shape of which is tapered. As can be seen in the drawing, a diameter of the top opening of the cylindrical body 39a is larger than that of the left upper communicating port 6. The left filling valve 39 is pivotally attached to the rotary shaft 41. An outer circumferential surface of the cylindrical body 39a from the opening to the bottom is composed of a curved surface 42, the shape of which is an arc formed round the rotary shaft 41.

In the same manner as that described above, in a portion close to the right upper communicating port 10, there is provided a right filling valve 44 having a rigid cylindrical body 44a. At a top portion of the cylindrical body 44a, there is provided an opening circumferential edge 45, the sectional shape of which is tapered. As can be seen in the drawing, a diameter of the top opening of the cylindrical body 44a is larger than that of the right upper communicating port 10. The right filling valve 44 is pivotally attached to the rotary shaft 46. An outer circumferential surface of the cylindrical body 44a from the opening to the bottom is composed of a curved surface 47, the shape of which is an arc formed round the rotary shaft 46. In this connection, the left filling valve 39 and the right filling valve 44 are symmetrical to each other.

Especially referring to FIGS. 15 to 18, reference numeral 51 designates an electrical control type pneumatic rotary cylinder for rotating the filling valve 39 by rotating the rotary shaft 41. In an upper portion of the cylindrical body 39a, on both sides of the cylindrical body 39a, there are provided hook brackets 53, the shape of which is a reverse U. A pair of protrusions 54 protrude from each hook bracket 53 in the horizontal direction. On both sides of the cylindrical body 39a, arms 55 extend from the rotary shaft 41. Each arm is arranged on the corresponding protrusion 54. An engaging pin 56 extending from the inner surface of each arm 55 in the horizontal direction is inserted into an opening formed in the facing hook bracket 53. As a result, the rotary shaft 41 and the cylindrical body 39 are connected to each other via a pair of arms 55. In this connection, reference numeral 57 designates a top opening of the cylindrical body 39a.

The structure of the right filling valve 44 is the same as that of the left filling valve. Therefore, explanation is omitted here. In the drawing, reference numeral 64 designates a protrusion of the right filling valve 44 which is formed in the same manner as that of the protrusion 54. Reference numeral 65 designates an arm of the right filling valve 44 which is formed in the same manner as that of the arm 55. Reference numeral 67 designates a top opening of the cylindrical body 44a. In this connection, the rotary cylinder may be respectively provided for each of the rotary shafts 41, 46. Alternatively, the rotary cylinder may be used in common between the rotary shafts 41, 46.

Referring again to FIGS. 11 to 18, the second embodiment will be explained in detail.

The left upper communicating port 6 is closed by the left filling valve 39 of the second embodiment as follows. The rotary cylinder 51 is driven and the rotary shaft 41 is rotated, so that the cylindrical body 39*a* of the filling valve 39 is rotated. Due to the above motion, the top opening circumferential edge 40 of the cylindrical body 39*a* is made to come tightly into contact with the sealing board 38 arranged in the outer circumference of the left upper communicating port 6. In this way, the left upper communicating port 6 is closed by the cylindrical body 39*a*.

In this way, since the top opening circumferential edge 40 of the cylindrical body 39*a* is made to come tightly into contact with the sealing board 38, no grit exists between the inner circumferential surface of the top opening 57 of the cylindrical body 39*a* and the outer circumferential surface of the left upper communicating port 6. Therefore, no gap is formed between the inner circumferential surface of the top opening 57 of the cylindrical body 39*a* and the left upper communicating port 6. Accordingly, it is possible to positively close the left upper communicating port 6 sealingly.

There is no possibility that the grit comes into contact with the sealing board 38 provided on the outer circumference of the left upper communicating port 6. Accordingly, it is possible to close the left upper communicating port 6 sealingly.

Even if the grit is accumulated in a portion close to the left upper communicating port 6, the cylindrical body 39*a* of the left filling valve 39 proceeds to the left upper communicating port 6 while it is taking the grit 22 existing in its way therein. Accordingly, the cylindrical body 39*a* can smoothly and positively move without receiving resistance from the grit 22, and the left upper communicating port 6 can be sealingly closed.

Further, since an outer circumferential surface of the cylindrical body 39*a*, which moves to the left upper communicating port 6 and also moves from the left upper communicating port 6, is curved into an arc, the center of which is the rotary shaft 41, it is possible for the cylindrical body 39*a* to move in the grit 22 smoothly. Therefore, the opening and closing motion can be smoothly conducted.

When the left upper communicating port 6 should be opened, the rotary cylinder 51 is driven and the cylindrical body 39*a* is separated outside from a portion immediately below the left upper communicating port 6. As a result, a rear portion of the cylindrical body 39*a* is lifted up and the top opening 57 of the cylindrical body 39*a* is directed downward. Therefore, the grit 22 taken into the cylindrical body 39*a* is discharged outside the cylindrical body 39*a*.

In this way, the left filling valve 39 can be moved between a position at which the opening circumferential edge 40 of the cylindrical body 39*a* comes tightly into contact with the sealing board 38 so as to shut off the left upper communicating port 6, and a position at which the opening circumferential edge 40 of the cylindrical body 39*a* is separate from a position immediately below the left upper communicating port 6 so as to open the left upper communicating port 6.

Operation of the right filling valve 44 is the same as that of the left filling valve 39. Accordingly, an explanation is omitted here.

According to the present invention, it is possible to provide a fine particle feeder characterized in that: fine particles are smoothly and positively fed so that the feeding efficiency can be enhanced; the device can be made compact and the manufacturing cost can be reduced; and further the maintenance can be easily conducted. According to the present invention, it is also possible to provide a shot blasting device in which grit can be smoothly transported and blown out by a compact and inexpensive device and, further, the grit which has been used once can be recycled.

I claim:

1. A fine particle feeder comprising:
an upper chamber for storing fine particles;
a plurality of intermediate chambers arranged below the upper chamber in the horizontal direction;
a lower chamber arranged below the intermediate chambers, having a discharge port at the bottom thereof;
an upper communicating port for communicating the upper chamber with each intermediate chamber;
a lower communicating port for communicating each intermediate chamber with the lower chamber;
a filling valve arranged in each upper communicating port;
a feed valve arranged in each lower communicating port;
an upper pressure equalizer pipe for communicating the upper chamber with each intermediate chamber, the pipe being different from the upper communicating ports;
a lower pressure equalizer pipe for communicating each intermediate chamber with the lower chamber, the pipe being different from the lower communicating ports;
an upper pressure control valve arranged in each upper pressure equalizer pipe, closed, usually;
a lower pressure control valve arranged in each lower pressure equalizer pipe, closed usually;
means for opening a feed valve of the intermediate chamber, in which fine particles are accommodated, and closing a filling valve of the intermediate chamber so that the fine particles are fed from the intermediate chamber into the lower chamber when the fine particles must be fed from the intermediate chamber into the lower chamber, and for closing a feed valve of the remaining empty intermediate chamber and opening a filling valve in the intermediate chamber so that the fine particles are filled from the upper chamber into the intermediate chamber; and
means, when the fine particles are moved between the upper and the intermediate chambers or the intermediate and the lower chambers, for temporarily opening a pressure control valve in the pressure equalizing pipe arranged between these two chambers so that pressures in these two chambers are made almost equal,
wherein the fine particles are successively fed from the upper chamber to the intermediate chambers and the lower chamber, in turn, so as to continuously discharge the fine particles from the discharge port of the lower chamber.

2. The fine particle feeder according to claim 1, wherein the intermediate chambers comprise of two chambers adjacent to each other, and wherein the feed valve comprises a pivotable arm arranged in the lower chamber and a single valve body arranged at an end of the arm, the valve body selectively closing one of the lower communicating ports sealingly and opening the other lower communicating port, so that the closed lower communicating port, which has been closed by the valve body, and the opened lower communicating port are alternately and repeatedly changed when the arm is pivoted repeatedly.

3. The fine particle feeder according to claim 1, wherein a sensor for detecting a quantity of fine particles accommodated in the lower chamber is arranged in the lower chamber, and the fine particles are fed from the intermediate chambers into the lower chamber when the quantity of fine particles detected by the sensor becomes smaller than a predetermined value.

4. The fine particle feeder according to claim 1, wherein the filling valve comprises: a cylindrical body having a bottom, arranged below the corresponding upper communicating port, the top opening of the cylindrical body being larger than the corresponding upper communicating port; and a sealing board which protrudes like a flange shape from the corresponding upper communicating port above the outlet circumferential edge of the upper communicating port, and wherein the cylindrical body is pivotable between a position at which the opening circumferential edge of the cylindrical body is separated outside from a position immediately below the upper communicating port so as to open the upper communicating port, and a position at which the opening circumferential edge of the cylindrical body tightly comes into contact with the sealing board so as to shut off the upper communicating port.

5. The fine particle feeder according to claim 4, wherein an outer circumferential surface of the cylindrical body from the opening to the bottom is formed into an arc, the center of which coincides with a rotary shaft of the cylindrical body.

6. The fine particle feeder according to claim 1, wherein the discharge port of the lower chamber is connected to a transport pipe in which air at high pressure is transported, so that fine particles discharged from the discharge port are pneumatically transported in the transport pipe by air at high pressure.

7. A shot blasting device comprising:
- a fine particle feeder according to claim 6, the fine particle comprising fine particle-shaped grit for shot blasting;
- a shot device for shot blasting, having a shot port for shot grit and a discharging port, the shot port being connected to a discharge port of the transport pipe of the fine particle feeder;
- suction means, connected to the discharge port of the shot device for shot blasting, for sucking air from the shot device for shot blasting;
- separation means, arranged between the shot device for shot blasting and the suction means, for separating grit from the inflowing air and for returning the separated grit into the upper chamber; and
- removing means, arranged between the separation means and the suction means, for removing dust from the inflowing air.

* * * * *